United States Patent [19]

Davis

[11] Patent Number: 5,668,982

[45] Date of Patent: Sep. 16, 1997

[54] SYSTEM AND METHOD FOR USING A HALF-CLOCK MODULE TO IMPLEMENT COMPUTER TIMING CONTROL CIRCUITRY

[75] Inventor: Ian E. Davis, Fremont, Calif.

[73] Assignee: National Semiconductor Corporation, Santa Clara, Calif.

[21] Appl. No.: 565,502

[22] Filed: Nov. 30, 1995

[51] Int. Cl.$^6$ ............................................. G06F 1/04
[52] U.S. Cl. ............................ 395/559; 395/555
[58] Field of Search ................................. 395/551, 555, 395/559

[56] References Cited

U.S. PATENT DOCUMENTS 5,202,642  4/1993  Dixon ......................................... 328/14
5,265,049  11/1993  Takasugi ............................. 365/189.01
5,325,515  6/1994  Cobbs ......................................... 395/550

*Primary Examiner*—Thomas M. Heckler
*Attorney, Agent, or Firm*—Limbach & Limbach L.L.P.

[57] ABSTRACT

A computer timing control apparatus including, and a method of using, a controller for providing a toggle-rising signal and a toggle-falling signal, and a half-clock module for sampling the toggle-rising signal and the toggle-falling signal, and generating a module output signal which toggles on the rising edge of the system clock signal if the toggle-rising signal is asserted when sampled, and toggles on the next falling edge of the system clock signal if the toggle-falling signal is asserted when sampled.

20 Claims, 10 Drawing Sheets

SYSTEM AND METHOD FOR USING A HALF-CLOCK MODULE TO IMPLEMENT COMPUTER TIMING CONTROL CIRCUITRY

BACKGROUND OF THE INVENTION

1. Field of the Invention

This invention relates generally to computer timing control circuits and more particularly to a system and method for using an improved half-clock design module to implement computer timing control circuitry.

2. Description of the Prior Art

Processing speed is a critical feature in most computer systems and is thus an important consideration for both computer users and computer manufacturers. A computer system with a faster processing speed is generally able to produce more work-product than a system having a slower processing speed, so modern computing systems are typically designed with maximum processing speed as an important engineering goal.

Computer processing speeds are significantly affected by the computer system's clock frequency, with higher clock frequencies usually resulting in higher processing speeds. In general, a clock signal is distributed to the various electronic circuits within a computer system to control timing of the system's digital signals and thereby synchronize the computing process. Typically, the clock signal consists of a series of digital pulses having a specified frequency and specified voltage levels. Each clock pulse has a rising edge and a falling edge, however, conventional computer systems and design synthesis tools typically utilize only the rising edge of the clock pulse to synchronize the computer's digital signals.

Attempts to achieve higher clock speeds have conventionally utilized clock-doubler devices. FIG. 1 shows a conventional prior art clock doubling system. A prior art system clock 10 provides to clock doubler 14 a CLK×1 signal 12 which is converted into a second CLK×2 signal 16 having twice the frequency of CLK×1 signal 12. CLK×2 signal 16 is then provided to the appropriate prior art computer circuitry 18 to clock the system at the doubled rate. Only one edge of the doubled clock signal is typically used to clock the digital circuitry.

Higher clock rates effectively speed up processing time, but increased clock frequencies also can significantly increase power consumption. The increased power consumption is primarily due to the increased electrical current drawn during the greater number of clock transitions between high and low digital voltage states. This increased power consumption results in higher computer operation costs. In battery-powered systems, such as notebook computers, increased power consumption also reduces battery life. High-speed computer systems which use a clock doubler also must determine and minimize the skew between the doubled clock signal and the system clock signal. If the skew is very long or indeterminate, it may be difficult to keep the clock doubler and the system clock tightly synchronized.

Clock-doublers have another economic impact on the cost of implementing a computer system. Clock-doubling circuitry typically requires a number of additional electrical components and associated circuitry, which add to the expense of implementing the computer system. Further, clock-doublers are a relatively inflexible way to speed up computer processing. During the computer design process, design engineers may require a specialized timing control device to control a smaller subsection of the computer electronics. Clock doublers typically use an "all or nothing" approach in which a single clock doubler device generates a doubled clock signal which then performs the clocking functions for all of the computer circuitry. This approach makes it difficult to use a clock doubler to selectively supply timing pulses to individual circuits within the computer electronics.

Although a clock doubler effectively doubles the system clock frequency, computer systems which feature clock doublers still typically utilize only one edge of the doubled clock signal to control timing of the digital circuitry. It would be useful to use either edge of the system clock signal to control generating a signal, and then to use the generated signal to control selected computer circuitry.

Therefore, an improved system and method is needed to economically implement computer timing control circuitry using an improved half-clock design module.

SUMMARY OF THE INVENTION

In accordance with the present invention, a system and method are disclosed for using an improved half-clock design module to implement computer timing control circuitry. In the preferred embodiment, the system includes a system clock device capable of generating a system clock signal, which typically consists of a series of digital pulses each having a rising edge and a falling edge. The system clock pulses occur at a specified frequency and typically have a duty cycle of fifty percent. The system also includes a controller device able to selectively generate a discrete toggle-rising signal and a discrete toggle-falling signal. The toggle-rising signal and the toggle-falling signal may be asserted or deasserted at any time and may be of any duration. The system also includes a half-clock design module which samples the toggle-rising signal and the toggle-falling signal, and responsively generates a half-clock module output signal which may be used selectively to control specified digital computer circuitry A method is also disclosed for implementing computer timing control circuitry using an improved half-clock design module. First, a conventional system clock device is used to generate a digital system clock signal consisting of digital pulses having specified voltage values at a specified frequency. Each clock pulse has a rising edge and a falling edge. Next, a controller device generates a discrete toggle-rising signal and a discrete toggle-falling signal. The timing and duration of the toggle-rising signal and the toggle-falling signal are selectable depending on the particular design application being implemented.

The system clock signal, the toggle-rising signal, and the toggle-falling signal are then provided to a half-clock module. The half-clock module individually samples the toggle-rising signal and the toggle-falling signal, preferably on the system clock signal's rising edge. The half-clock module then responsively generates a half-clock module output signal which changes state on the system clock signal's concurrent rising edge if the toggle-rising signal is asserted when sampled. The half-clock module output signal changes state on the system clock signal's next falling edge if the toggle-falling signal is asserted when sampled. Finally, the half-clock module output signal is provided to selected computer circuits for digital timing control.

A number of embodiments are disclosed. One embodiment consists of a pulse module which generates a single half-clock pulse aligned with either the rising edge or the falling edge of the system clock signal. Another embodiment consists of a set/reset module which features two "set" inputs and two "reset" inputs. The output can be asserted (set) or deasserted (reset) concurrent with either the rising edge or the falling edge of the system clock signal. Another embodiment consists of a data module which propagates a given input data value through to the data module output on either the rising edge or the falling edge of the system clock signal.

DETAILED DESCRIPTION OF THE PREFERRED EMBODIMENT

Computer systems conventionally contain a system clock device which generates timing control signals to synchronize the digital circuitry. The computer clock signal consists of a series of digital pulses each having a rising edge and a falling edge. The computer's digital circuitry, however, is typically clocked using only one edge of the system clock signal. Synthesis tools used to design digital circuits are also typically limited to using only one clock edge. In controlling a computer component, such as a microprocessor or a dynamic random access memory (DRAM), it would be useful to control the circuitry with both rising and falling edges of the system clock. The present invention is a half-clock design module which is compatible with system clocks and design synthesis tools, but which can generate a timing control signal based on either the rising edge or the falling edge of the system clock signal.

Figure 1:
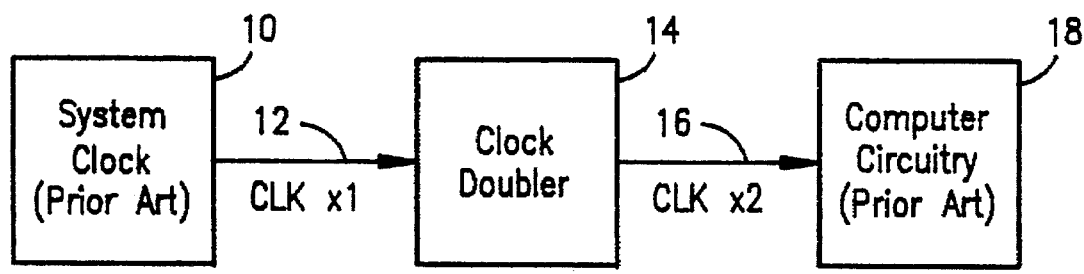
FIG. 1 is a block diagram showing a prior art system for doubling the frequency of a system clock signal.
Figure 2:
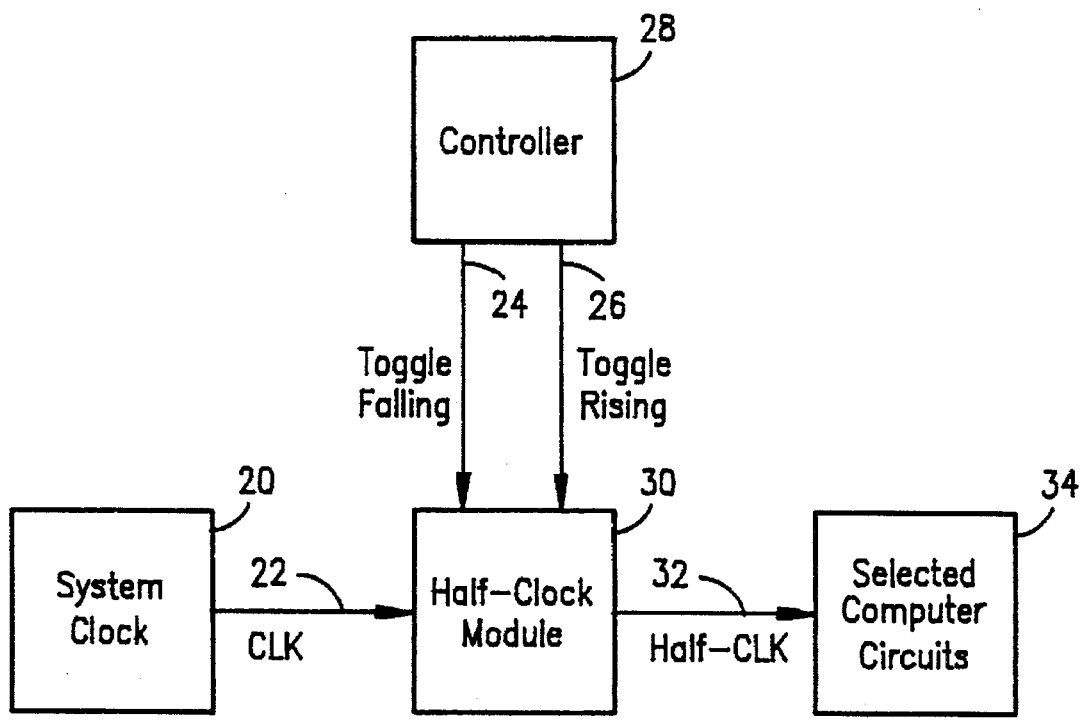
FIG. 2 is a block diagram showing the use of a half-clock design module to implement computer timing control circuitry.

FIG. 2 is a block diagram showing a basic system to implement computer timing control circuitry using an improved half-clock module. A system clock 20 generates a CLK signal 22, preferably a series of standard digital pulses having a specified frequency, specified voltage levels, and a duty cycle of typically fifty percent. A controller device 28 generates a discrete toggle-falling signal 24 and a discrete toggle-rising signal 26 on respective output lines. In the preferred embodiment, controller device 28 may be a microprocessor residing within the computer system, or, alternatively, control device 28 may be any other timing control circuitry, such as a DRAM controller.

Half-clock module 30 receives CLK signal 22, toggle-falling signal 24, and toggle-rising signal 26 on respective input lines. Preferred embodiments of the half-clock module 30 and their operation are described in greater detail with reference to FIGS. 3 through 9 below. In response to CLK signal 22, toggle-falling signal 24, and toggle-rising signal 26, half-clock module 30 generates a half-clock module output signal 32 which may then be used to control selected computer circuits 34, depending on the particular circuit design being implemented.

Figure 3:
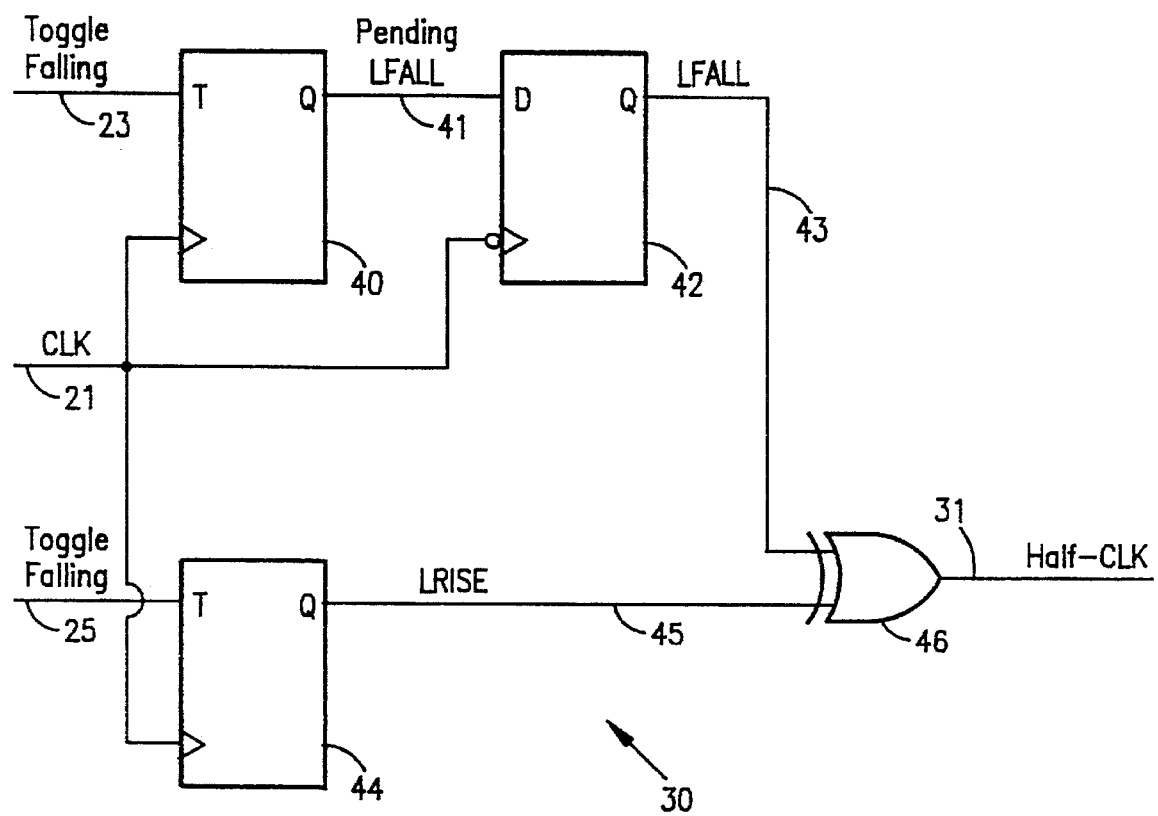
FIG. 3 is a schematic diagram showing a preferred embodiment of the present invention's half-clock design module.

FIG. 3 is a schematic diagram showing a preferred embodiment of a half-clock module 30 according to the present invention. Other equivalent electrical configurations may be substituted to implement the half-clock module within the scope of the invention. In FIG. 3, a toggle-falling signal is applied on line 23 to the T input of toggle-falling T flip-flop 40, and the system CLK signal is applied on line 21 to its clock input. Toggle-falling T flip-flop 40 generates toggle-falling T flip-flop output signal (Pending LFALL) at its Q output on line 41. The toggle-falling T flip-flop output signal on line 41 is applied to the D input of a delay D flip-flop 42, and the CLK signal on line 21 is applied to an inverting clock input of delay D flip-flop 42. Delay D flip-flop 42 then generates a delay D flip-flop output signal (LFALL) at its Q output on line 43.

A toggle-rising signal is applied on line 25 to the T input of a toggle-rising T flip-flop 44, and the CLK signal on line 21 is applied to its clock input. Toggle-rising T flip-flop 44 generates a toggle-rising T flip-flop output signal (LRISE) at its Q output on line 43. The delay D flip-flop output signal on line 43 and the toggle-rising T flip-flop output signal on line 45 are applied to respective inputs of an output exclusive-or (XOR) gate 46 that responsively generates a half-clock module output signal on line 31 which can be used to control computer circuitry.

Figure 4:
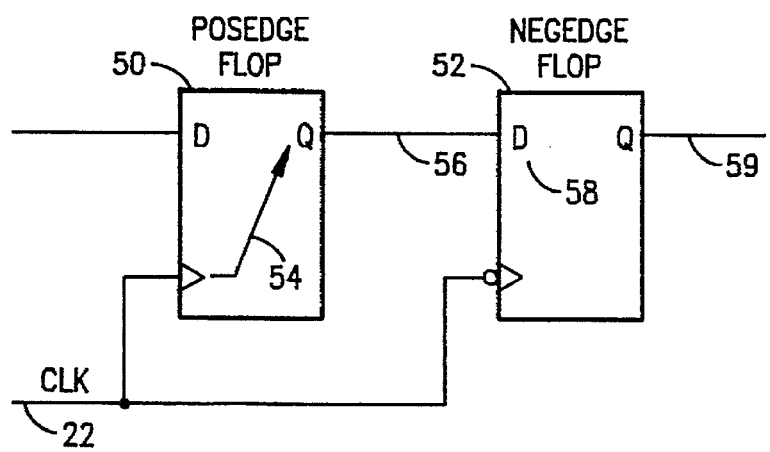
FIG. 4 is a schematic diagram showing a positive-edge clocked flip-flop connected to a negative-edge clocked flip-flop.

FIG. 4 is a schematic diagram showing a positive-edge docked flip-flop 50 connected to a negative-edge clocked flip-flop 52 to illustrate a timing problem overcome by half-clock module 30. Connecting a positive-edge clocked flip-flop 50 and a negative-edge clocked flip-flop 52 can produce timing problems due to the propagation delay of the flip-flops 50 and 52. This problem is accentuated when other logic circuitry is interposed between flip-flops 50 and 52. The half-clock module 30 of the present invention may be used effectively to overcome such timing problems assuming that the period of CLK signal 22 is longer than a value obtained using the formula:

$$2*(A+B+C)$$

where A equals flip-flop intrinsic delay 54, B equals flip-flop load delay 56, and C equals flip-flop data set-up time 58.

Flip-flop intrinsic delay 54 is the propagation delay measured between CLK signal 22 and the Q output of flip-flop 50. Flip-flop load delay 56 is the "flight-time" for a logic signal passing from flip-flop 50 to flip-flop 52. Load delay 56 is due to capacitive load, conductor length, and other output-loading factors. Flip-flop data set-up time 58 is the time required for input data to stabilize at flip-flop 52. Any data input to a flip-flop must be stable for a specified length of time prior to the active edge of CLK signal 22 (falling edge on flip-flop 52). If this stabilization criteria is not met, the output 59 of flip-flop 52 is of indeterminate state. Half-clock module 30 overcomes these propagation delay timing problems, assuming that the period of CLK signal 22 is of sufficient duration, as discussed above.

Figure 5:
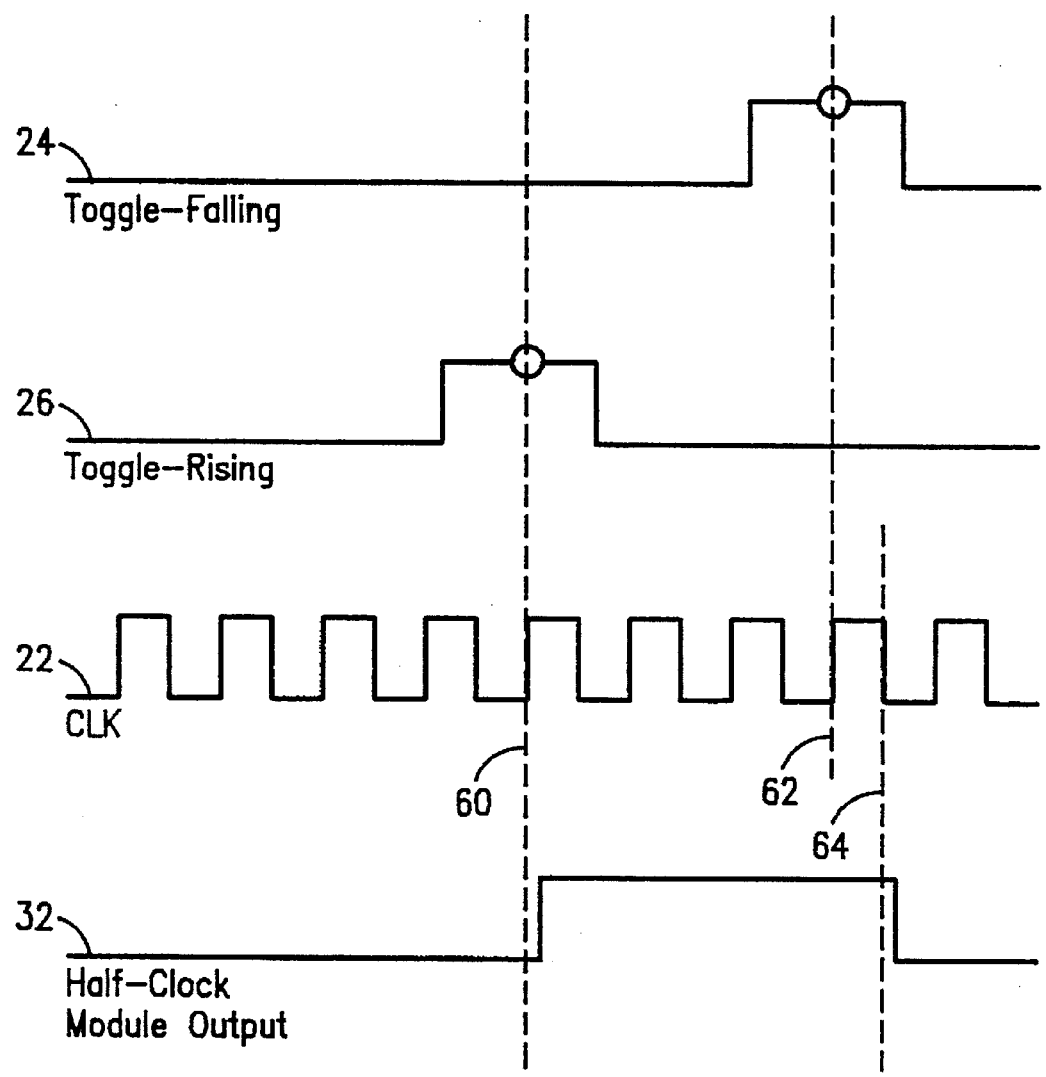
FIG. 5 a timing diagram showing the relationships between a system clock signal, a toggle-rising signal, a toggle-falling signal, and the half-clock module output signal, where the module output signal is a pulse aligned to the system clock signal's rising edge.

FIG. 5 is a timing diagram showing the relationships between a system CLK signal 22 and a toggle-falling signal 24 and a toggle-rising signal 26 selected to produce a half-clock module output signal pulse 32 aligned to a rising edge of the system clock signal and lasting three and one-half system clock cycles. In general, the invention can produce module output pulse signals 32 synchronized with either a rising or a falling edge of system clock signal 22 and having durations equal to any integer multiple of one-half the system clock period. The duration and timing of module output signal 32 can be controlled by selecting the appropriate timing and duration of asserted toggle-falling signal 24 and toggle-rising signal 26.

In operation, the preferred embodiment of the half-clock module samples toggle-rising signal 26 and toggle-falling signal 24 only on the rising edge of system CLK signal 22. Upon sampling, if toggle-rising signal 26 is asserted, module output signal 32 is immediately toggled on the concurrent rising edge of system CLK signal 22. If toggle-falling signal 24 is asserted when sampled, module output signal 32 is toggled on the next falling edge of system CLK signal 22. Thus, to have module output signal 32 change state on a particular rising edge of system CLK 22, toggle-rising signal 26 must be asserted before and during that rising edge. To have module output signal 32 change state on a particular falling edge of system CLK 22, toggle-falling signal 24 must be asserted before and during the rising edge preceding the particular falling edge.

In FIG. 5, system CLK signal 22 consists of a series of digital pulses having a specified frequency, specified voltage levels, and a fifty-percent duty cycle. Toggle-falling signal 24 and toggle-rising signal 26 are generated by a controller device, and may be individually asserted at any selected time and for any selected duration. Half-clock module output signal 32 is generated by a half-clock module responsive to toggle-falling signal 24, toggle-rising signal 26, and system CLK signal 22.

At time 60, the CLK signal 22 rising edge clocks flip-flop 44 (FIG. 3) to sample toggle-rising signal 26, and clocks flip-flops 40 and 44 to sample their respective input signals. Since only toggle-rising signal 26 is asserted high when sampled, only flip-flop 44 produces a high signal at its Q output on line 45, and just that one high signal is received by XOR gate 46. Consequently, module output signal 32 toggles to high after a short delay due to signal propagation time. Toggle-rising signal 26 is deasserted before the next rising edge of CLK signal 22, so when sampled on that next rising edge, signal 26 does not cause flip-flop 44 to toggle its output signal on line 45, so the module output signal on line 32 remains high.

Afterwards, toggle-falling signal 24 is asserted. At time 62, the CLK signal 22 rising edge clocks flip-flops 40 and 44 to sample their respective input signals 24 and 26. Then, since only toggle-falling signal 24 is asserted, only flip-flop 40 toggles its output signal on line 41 to the D input of flip-flop 42. At time 64, the next falling edge of system CLK 22 being applied to the inverting input of D flip-flop 42 latches a high signal to XOR gate 46, resulting in high signals on both lines 43 and 45 input to XOR gate 46 and thereby toggling output signal 32 after a short delay due to signal propagation time. Thus, this selected combination of toggle-rising signal 26 and toggle-falling signal 24 produce a module output synchronized with a leading edge of system CLK signal 22 and lasting three and one-half system CLK signal 22 pulses. In practice, propagation through the logic gates typically delays changes in module output signal 32 which lags slightly behind the triggering edge of system CLK signal 22.

Figure 6:
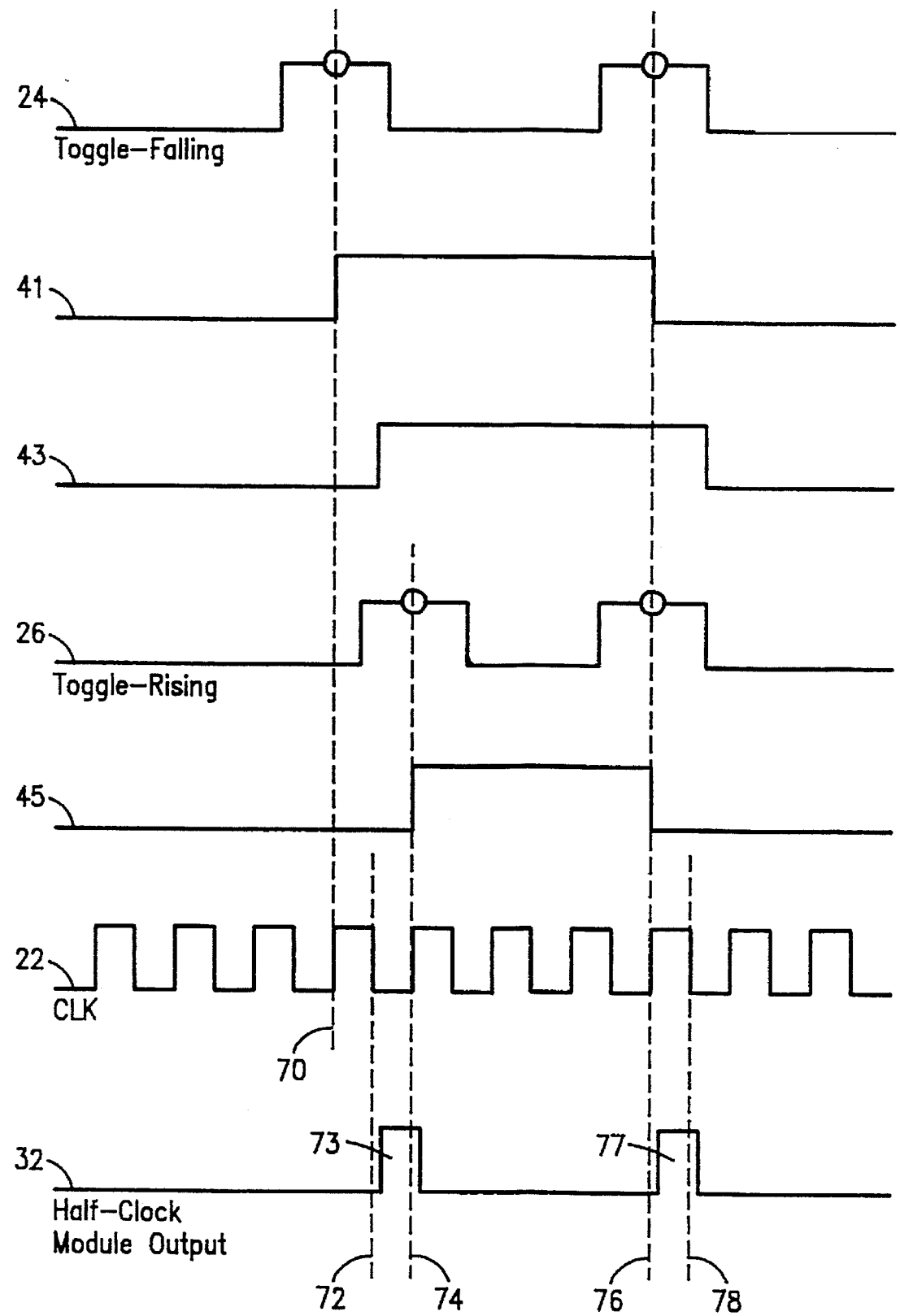
FIG. 6 is a timing diagram showing the relationships between a system clock signal, toggle-rising signals, toggle-falling signals, and half-clock module output signals, where the module output signals are half-clock pulses aligned to a rising edge and a falling edge of the system clock signal.

FIG. 6 is a timing diagram showing relationships between a system CLK signal 22 and a toggle-rising signal 26 and a toggle-falling signal 24 which are asserted and deasserted to produce a half-clock module output signal 32 including a first half-clock pulse 73 aligned with a falling edge of CLK signal 22 and a second half-clock pulse 77 aligned with a rising edge of CLK signal 22.

The combination of toggle-rising signal 26 and toggle-falling signal 24 at times 70, 72 and 74 produces half-clock module output pulse 73 which is slightly delayed due to signal propagation time. The CLK signal 22 rising edge at time 70 triggers T flip-flop 40 to sample toggle-falling signal 24, which has been asserted, and to produce a high-level signal at its Q output on line 41. Toggle-falling signal 24 is then deasserted, so that flip-flop 40 leaves a high level signal on line 41 At time 72, the CLK signal 22 falling edge applied to the inverting clock input of D flip-flop 42 triggers the flip-flop to propagate the line 41 high-level signal to the Q output line 43. Since toggle-rising signal 26 was not asserted during the rising edge at time 70, only line 43 applies a high signal to XOR gate 46, which raises output signal 32 shortly after time 72 to begin pulse 73. Toggle-rising signal 26 is then asserted, and at time 74, the rising edge of CLK signal 22 triggers flip-flop 44 to sample toggle-rising signal 26 and latch a high-level signal on line 45 to an input of XOR gate 46. Since there are now high level signals on both input lines to XOR gate 46, it lowers module output signal 32, ending pulse 73. Thus, this selected combination of toggle-rising signal 26 and toggle-falling signal 24 have produced a module output pulse signal 32 triggered by a falling edge of CLK signal 22 and having a duration of one-half of the clock signal 22 period.

A selected combination of toggle-rising signal 26 and toggle-falling signal 24 at time 76 produces a half-clock module output pulse signal 77 triggered by the rising edge of CLK signal 22 and slightly delayed due to signal propagation time. At time 76, the rising edge of CLK signal 22 triggers both flip-flops 40 and 44 to sample their respective toggle control signals. Because toggle-rising signal 26 is asserted when sampled, flip-flop 44 toggles its output signal on line 45 to low. Since the line 43 remains high after pulse 73, there is now one high level signal input to XOR gate 46, which raises the line 32 module output signal to begin pulse 77 following a slight delay due to signal propagation time. Because toggle-failing signal 24 is asserted when sampled, flip-flop 40 toggles its output signal on line 41 to low. At time 78 the next falling edge of CLK signal 22 applied to the inverting clock input of D flip-flop 42 triggers the flip-flop to propagate the line 41 high level signal to the Q output line 43. There are now two low level signals being input to XOR gate 46, which lowers module output signal 32, ending pulse 73. Thus, the selected combination of toggle-rising signal 26 and toggle-falling signal 24 at axis 76 have produced a module output pulse signal 32 triggered by a rising edge of CLK signal 22, and having a duration of one-half of the CLK signal 22 period.

The half-clock module output signal 32 may be used to significantly improve computer processing time. For example, the present invention may be used to successfully implement a DRAM controller. When a computer processor and a DRAM operate together, the processor provides a set of control signals to transfer data in and out of memory, however, the DRAM requires a different set of signals to perform the data storage and retrieval functions. Also, the DRAM's refresh cycle might require communication with the processor. Therefore, an interface or DRAM controller is needed to receive signals from the processor and convert them into signals understood by the DRAM.

In operation, a DRAM controller essentially generates the signals required to manipulate a DRAM device, including RAS# (Row Access Strobe), CAS# (Column Access Strobe), WE# (Write Enable), and MA (Memory Address). The DRAM controller also generates internal sample control signals for latching data when reading data from DRAM devices and control signals for issuing data to the DRAM when writing.

In theory, if the DRAM only requires ten nanoseconds to perform a given function, and if the system clock has a period of twenty nanoseconds, then, ten nanoseconds is wasted each time the DRAM performs the given function. The present invention could provide a control signal having a duration of ten nanoseconds, thereby effectively increasing the processing speed. Further, the present invention is able to align control pulses to either rising or falling edges of system CLK signal 22 to allow greater timing control flexibility in implementing digital circuitry.

In practice, clock signals are generated with a given duty cycle plus or minus a tolerance (for example 45/55, indicating that the duty cycle may vary from 45% to 55%). Other factors such as clock skew (small differences between clock signal incidence at individual device flip-flops) also affect timing-control precision. Therefore, exact timing relative to the clock frequency is not possible. Given these tolerances, however, the above example is essentially valid (i.e.: if a given DRAM timing parameter is seven nanoseconds, and a system clock has a period of twenty nanoseconds, then half the system clock period (10 nanoseconds) can safely be used, instead of using a full twenty-nanosecond system clock pulse.

The half-clock module 30 of the present invention provides a basis for several alternate embodiments, including a pulse module 80, a set/reset module 90, and a data module 100. These alternate embodiments include ancillary input circuits which provide the toggle-rising signals 26 and the toggle-falling signals 24 to the half-clock module 30. Thus, the various embodiments of the present invention may be used throughout a DRAM controller to control timing of the various DRAM signals. For example, half-clock module 30 may be used to generate the RAS# and CAS# outputs, controlled via the main DRAM FSM. Data module 100 may be used to drive portions of the MA (Memory Address) signals, when reading sequential addresses. Set/Reset modules are used to generate MUX control signals for switching the entire MA bus between different values for various applications (for example, DRAM row address, column address, refresh address, and sequential column address). Pulse module 80 and half-clock module 30 may be used to sample data when reading from DRAM.

Figure 7:
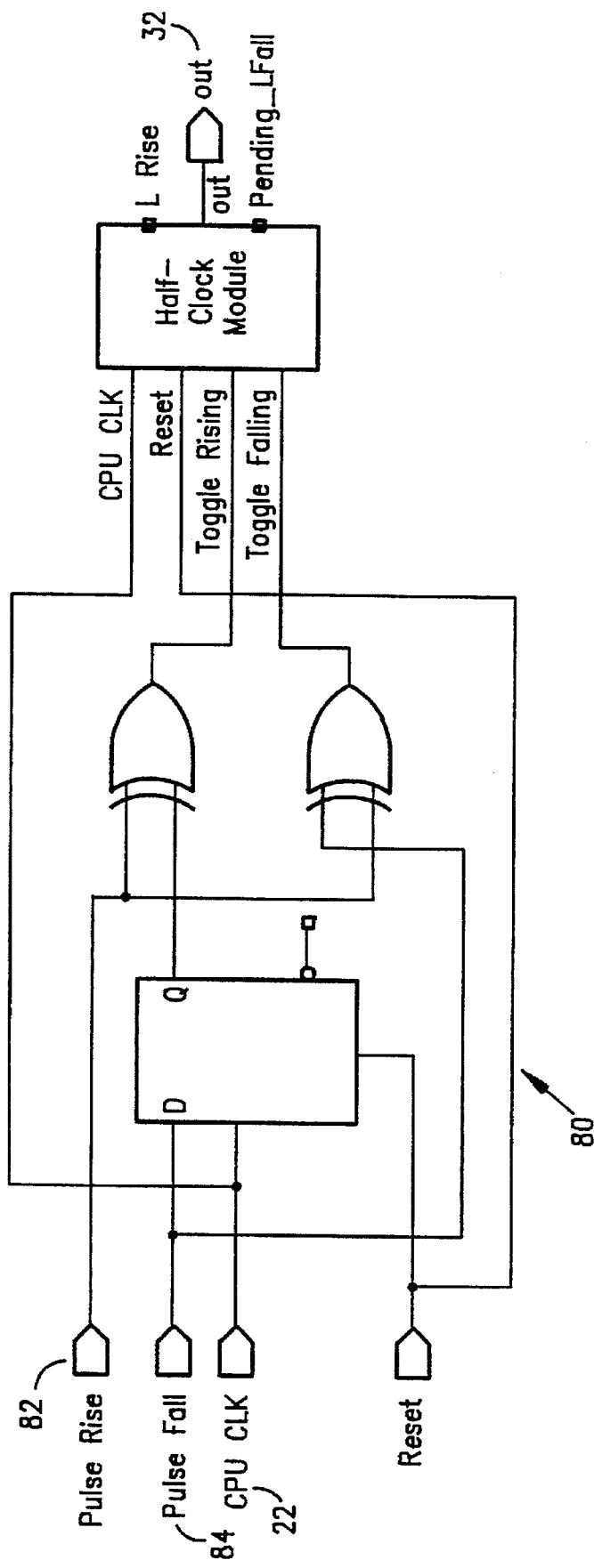
FIG. 7 is a schematic diagram showing an embodiment of the present invention as a pulse module.

FIG. 7 is a schematic diagram of one alternate embodiment comprising a pulse module 80 which generates a single half-clock pulse aligned with either a rising edge or a falling edge of the system CLK signal 22. The pulse module embodiment samples a pulse-rising signal 82 and a pulse-falling signal 84 on each rising edge of CLK signal 22. If the pulse-rising signal 82 is asserted when sampled, a single half-clock pulse is generated on the same rising edge of CLK signal 22. If the pulse-falling signal 84 is asserted when sampled, a single half-clock pulse is generated on the next falling edge of CLK signal 22. If both pulse-rising signal 82 and pulse-falling signal 84 are asserted when sampled, a glitch-free full-clock module output signal 32 pulse is generated on the same rising-edge of CLK signal 22.

Figure 8:
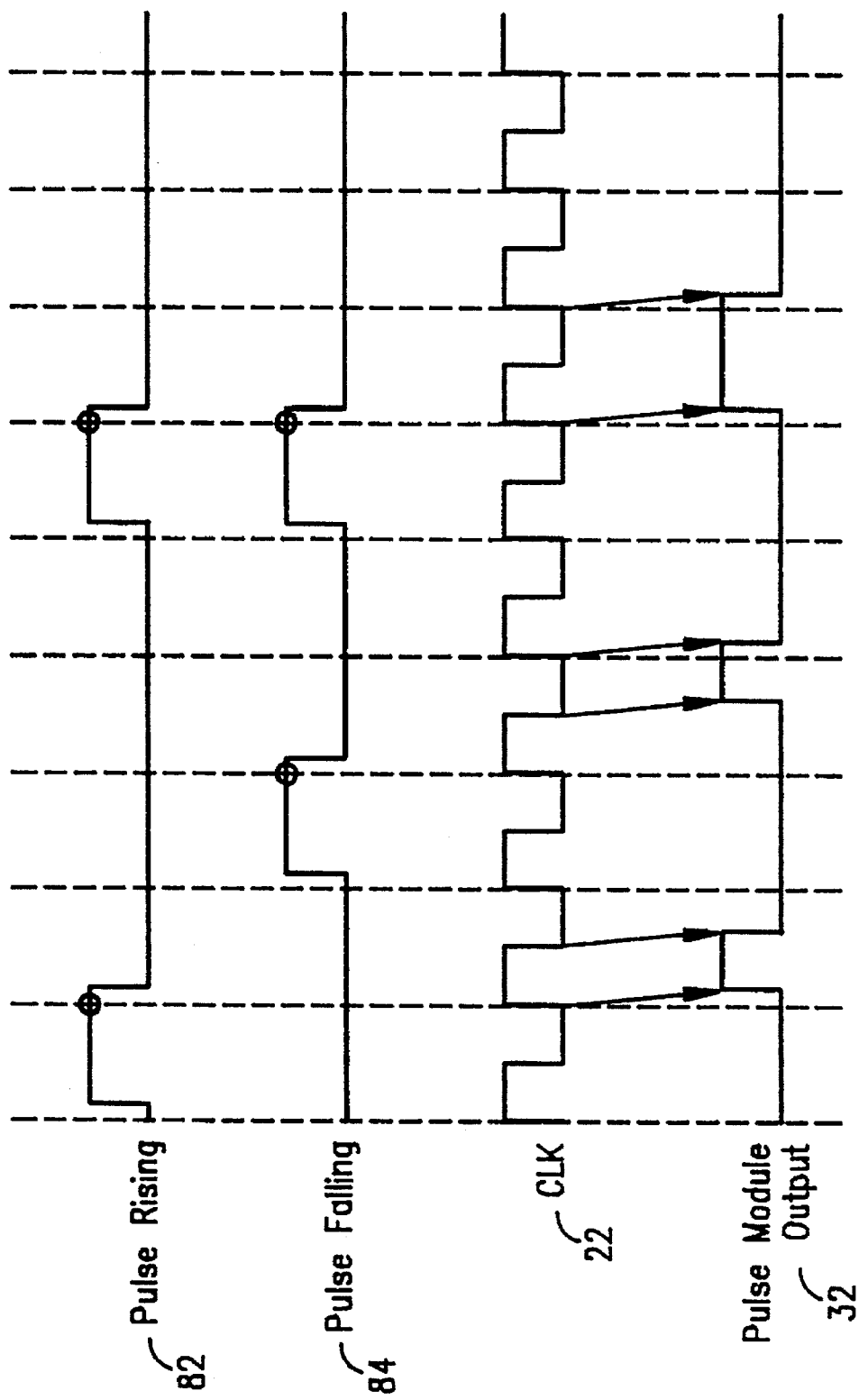
FIG. 8 is a timing diagram showing the relationships between a system clock signal, control signals, and module output signals for the pulse module embodiment of the present invention.

FIG. 8 is a timing diagram showing the relationships between a CLK signal 22, control signals 82 and 84, and module output signal 32 for a pulse module 80 embodiment of the present invention. Operation of pulse module 80 is illustrated with this particular combination of pulse-rising signal 82 and pulse-falling signal 84 producing module output signal 32 relative to CLK signal 22 and delayed slightly due to signal propagation time.

Figure 9:
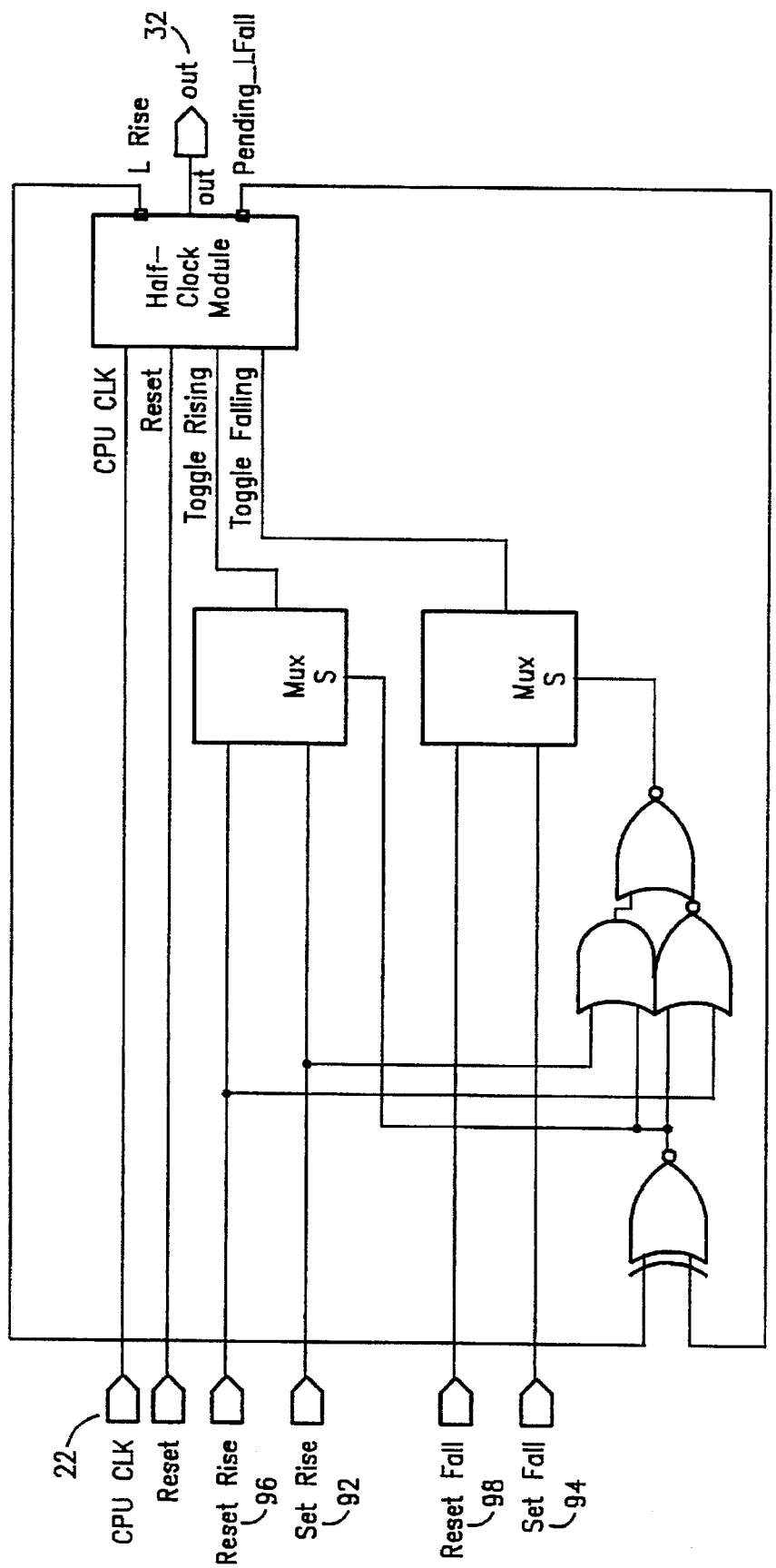
FIG. 9 is a schematic diagram showing an embodiment of the present invention as a set/reset module.

FIG. 9 is a schematic diagram of a second alternate embodiment comprising a set/reset module 90 having two "set" signal inputs and two "reset" signal inputs. The set/reset module embodiment samples a set-rising signal 92 and a set-falling signal 94 on each rising edge of CLK signal 22. If the set-rising signal 92 is asserted when sampled, module output signal 32 is set on the same rising edge of the CLK signal 22. If the set-falling signal 94 is asserted when sampled, module output signal 32 is set on the next falling edge of CLK signal 22. The set/reset module 90 embodiment also samples a reset-rising signal 96 and a reset-falling signal 98 on each rising edge of CLK signal 22. If the reset-rising signal 96 is asserted when sampled, module output signal 32 is reset on the same rising edge of the CLK signal 22. If the reset-falling signal 98 is asserted when sampled, module output signal 32 is reset on the next falling edge of CLK signal 22. The module output signal 32 can thus be asserted (set) or deasserted (reset) coincident with either the rising edge or the falling edge of the system CLK signal 22.

Figure 10:
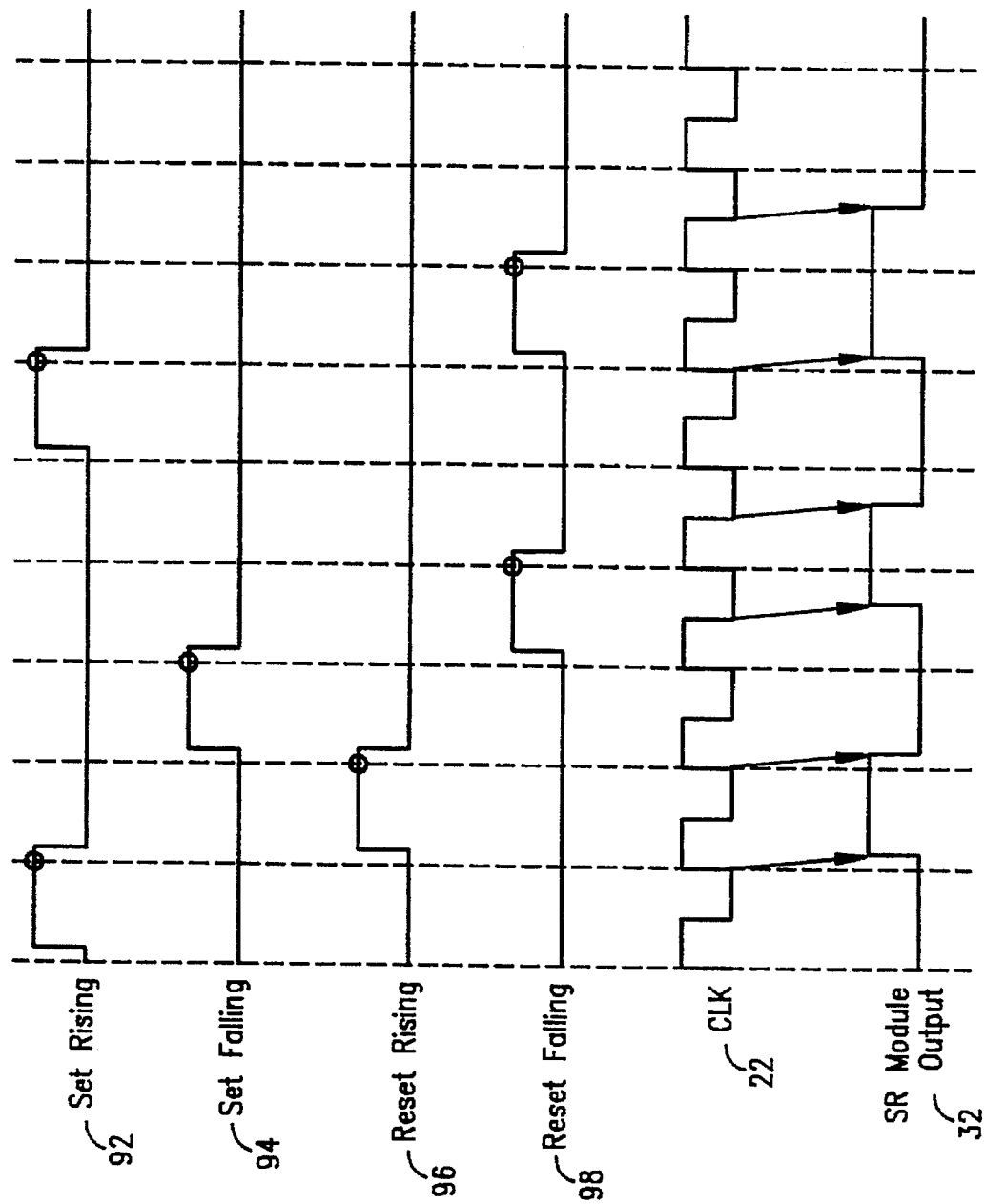
FIG. 10 timing diagram showing the relationships between a system clock signal, control signals, and module output signals for the set/reset module embodiment of the present invention.

FIG. 10 is a timing diagram showing the relationships between a CLK signal 22, control signals 92, 94, 96, and 98, and module output signal 32 for the set/reset module 90 embodiment of the present invention. Operation of set/reset module 90 is illustrated with this particular combination of set-rising signal 92, set-falling signal 94, reset-rising signal 96, and reset-falling signal 98 producing a module output signal 32 relative to CLK signal 22 and delayed slightly due to signal propagation time.

Figure 11:
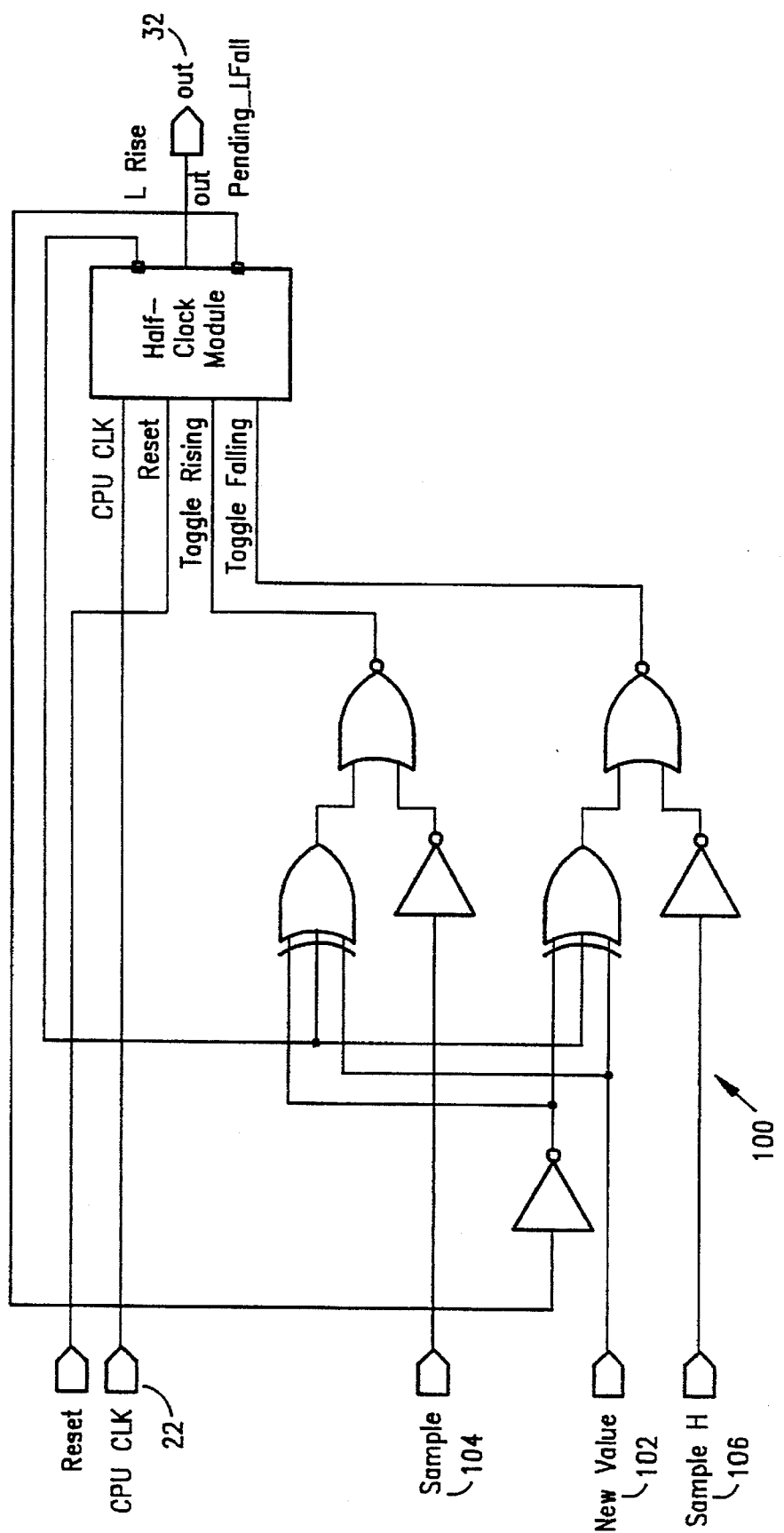
FIG. 11 is a schematic diagram showing an embodiment of the present invention as a data module.

FIG. 11 is a schematic diagram of a third alternate embodiment comprising a data module 100 which propagates an input data value 102 to the module output 32 on either a rising or a falling edge of system CLK signal 22. The data module 100 embodiment samples a sample-rising signal 104 and a sample-falling signal 106 on each rising edge of CLK signal 22. If the sample-rising signal 104 is asserted when sampled, the input data value 102 is propagated to the module output 32 on the rising edge of CLK signal 22. If the sample-falling signal 106 is asserted when sampled, the input data value 102 is propagated to the module output 32 on the next falling edge of CLK signal 22.

Figure 12:
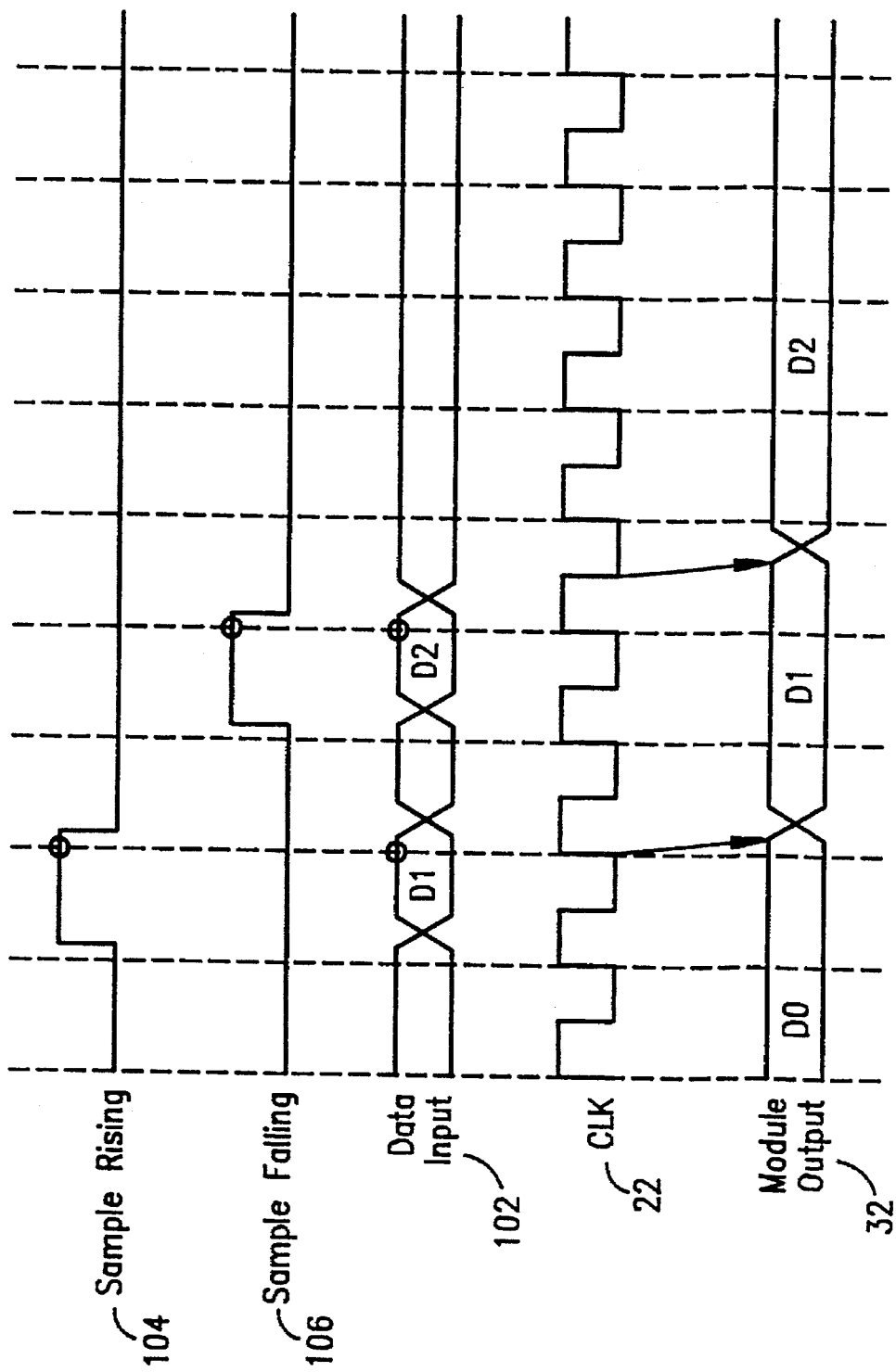
FIG. 12 is a timing diagram showing the relationships between a system clock signal, a data input signal, control signals, and module output signals for the data module embodiment of the present invention.

FIG. 12 is a timing diagram showing the relationships between a CLK signal 22, a data input signal 102, control signals 104 and 106, and module output signal 32 for the data module 100 embodiment of the present invention. Operation of data module 100 is illustrated with this particular combination of sample-rising signal 104 and sample-falling signal 106 producing module output signal 32 relative to CLK signal 22 and delayed slightly due to signal propagation time.

The invention has been explained above with reference to several embodiments. Other embodiments will be apparent to those skilled in the art, in light of this disclosure. For example, instead of using the half-clock module to implement a computer DRAM controller, the half-clock module can be used to implement other digital timing control circuitry in which rising and falling clock edge flexibility is desirable. Further, the specific electrical configuration used to implement the half-clock module can be any combination which is equivalent to the disclosed embodiments. Therefore, these and other variations upon the disclosed embodiments are intended to be covered by the present invention, which is limited only by the appended claims.

What is claimed is:

1. A half-clock timing control module comprising:
   clock signal input means for receiving a system clock signal;
   control signal input means for receiving module control signals;
   module means responsive to the clock signal and the module control signals for generating a module output signal which changes state on selected rising and falling edges of the system clock signal; and
   module signal output means for providing the module output signal.

2. The module of claim 1 wherein the module control signals comprise a toggle-rising signal and a toggle-falling signal.

3. The module of claim 2 wherein the module control signals are sampled on rising edges of the system clock signal.

4. The module of claim 3, and further comprising a computer DRAM controller which provides the module control signals.

5. The module of claim 4, further comprising a DRAM circuit and wherein the module output signal is provided to the DRAM circuit.

6. A timing control device comprising:
   a system clock signal input for receiving a system clock signal having alternating rising edges and falling edges;
   toggle-control signal inputs for receiving toggle-control signals including a toggle-rising signal and a toggle-falling signal which have an asserted state and a deasserted state; and
   a half-clock module for generating a module output signal by, on each rising edge of the system clock signal, sampling the toggle-rising signal and the toggle-falling signal, and when the sampled toggle-rising signal is asserted, toggling the module output signal, and when the sampled toggle-falling signal is asserted, toggling the module output signal on the next falling edge of the system clock signal.

7. The device of claim 6, and further comprising a computer DRAM controller which provides the toggle-rising signal and the toggle-falling signal.

8. The device of claim 7, and further comprising a DRAM circuit and wherein the DRAM circuit receives the module output signal.

9. The device of claim 6 wherein the half-clock module comprises:
   a toggle-falling T flip-flop for receiving the system clock signal and the toggle-falling signal, and responsively generating a toggle-falling T flip-flop output signal;
   a delay D flip-flop for receiving the system clock signal and the toggle-falling T flip-flop output signal, and responsively generating a delay D flip-flop output signal, said D flip-flop having an inverting clock input for receiving said clock signal;
   a toggle-rising T flip-flop for receiving the system clock signal and the toggle-rising signal, and responsively generating a toggle-rising T flip-flop output signal; and
   an output XOR gate for receiving the delay D flip-flop output signal and the toggle-rising T flip-flop output signal and responsively generating the module output signal.

10. The device of claim 6, further comprising a microprocessor which provides the toggle-rising signal and the toggle-falling signal.

11. The device of claim 6, further comprising a pulse module input circuit responsive to a pulse-rising signal and to a pulse-falling signal to provide the toggle-rising signals and the toggle-falling signals which control the half-clock module, to generate a half-clock pulse synchronized with a system clock signal edge selected by the pulse-rising signal and the pulse-falling signal.

12. The device of claim 6, further comprising a set/reset module input circuit responsive to a set-rising signal, a set-falling signal, a reset-rising signal, and a reset-falling signal, to provide the toggle-rising signals and the toggle-falling signals which control the half-clock module, to set or reset the half-clock module output signal on a selected one of the edges of the system clock signal.

13. The device of claim 6, further comprising a data module input circuit responsive to a sample-rising signal and a sample-falling signal to provide toggle-rising signals and toggle-falling signals to control the half-clock module which propagates a data value input signal as the half-clock module output signal on a system clock signal edge selected by the sample-rising signal and the sample-falling signal.

14. A method of generating a digital timing control signal comprising the steps of:
   receiving a system clock signal having alternating rising edges and falling edges;
   receiving toggle-control signals including a toggle-rising signal and a toggle-falling signal;
   sampling the toggle-control signals on the rising edges of the system clock signal; and
   generating a half-clock module output signal by, on each rising edge of the system clock signal, sampling the toggle-rising signal and the toggle-falling signal, and when the sampled toggle-rising signal is asserted, toggling the module output signal, and when the sampled toggle-falling signal is asserted, toggling the module output signal on the next falling edge of the system clock signal.

15. The method of claim 14, and further comprising the step of using a computer DRAM controller to generate the toggle-rising signal and the toggle-falling signal.

16. The method of claim 15, further comprising the step of providing a DRAM circuit and wherein the DRAM circuit receives the module output signal.

17. Half-clock design module means comprising:
   means for receiving a system clock signal having alternating rising edges and falling edges;
   means for receiving toggle-control signals including a toggle-rising signal and a toggle-falling signal;
   means for sampling the toggle-control signals on the rising edges of the system clock signal; and
   means for generating a half-clock module output signal by, on each rising edge of the system clock signal, sampling the toggle-rising signal and the toggle-falling signal, and when the sampled toggle-rising signal is asserted, toggling the module output signal, and when the sampled toggle-falling signal is asserted, toggling the module output signal on the next falling edge of the system clock signal.

18. The module of claim 17, and further comprising a computer DRAM controller which provides the toggle-rising signal and the toggle-falling signal.

19. The module of claim 17 and further comprising a microprocessor which provides the toggle-rising and toggle-falling signal.

20. The module of claim 18, further comprising a DRAM circuit and wherein the DRAM circuit receives the module output signal.

* * * * *